Oct. 28, 1969     J. M. STOGNER     3,474,734
STUFFING BOX FOR A ROTARY PUMP
Filed March 8, 1968     3 Sheets-Sheet 1

INVENTOR
JOEL M. STOGNER

BY *Burns, Doane, Benedict, Swecker & Mathis*
ATTORNEYS

Oct. 28, 1969  J. M. STOGNER  3,474,734
STUFFING BOX FOR A ROTARY PUMP
Filed March 8, 1968  3 Sheets-Sheet 2
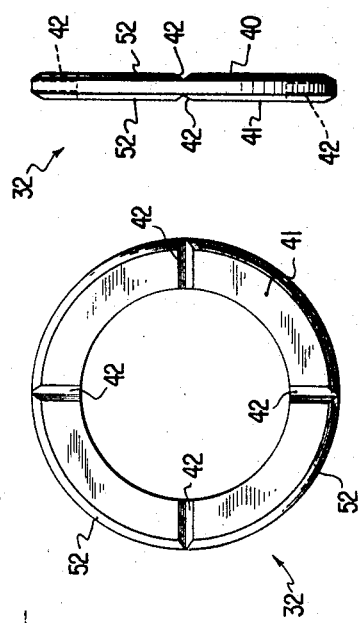
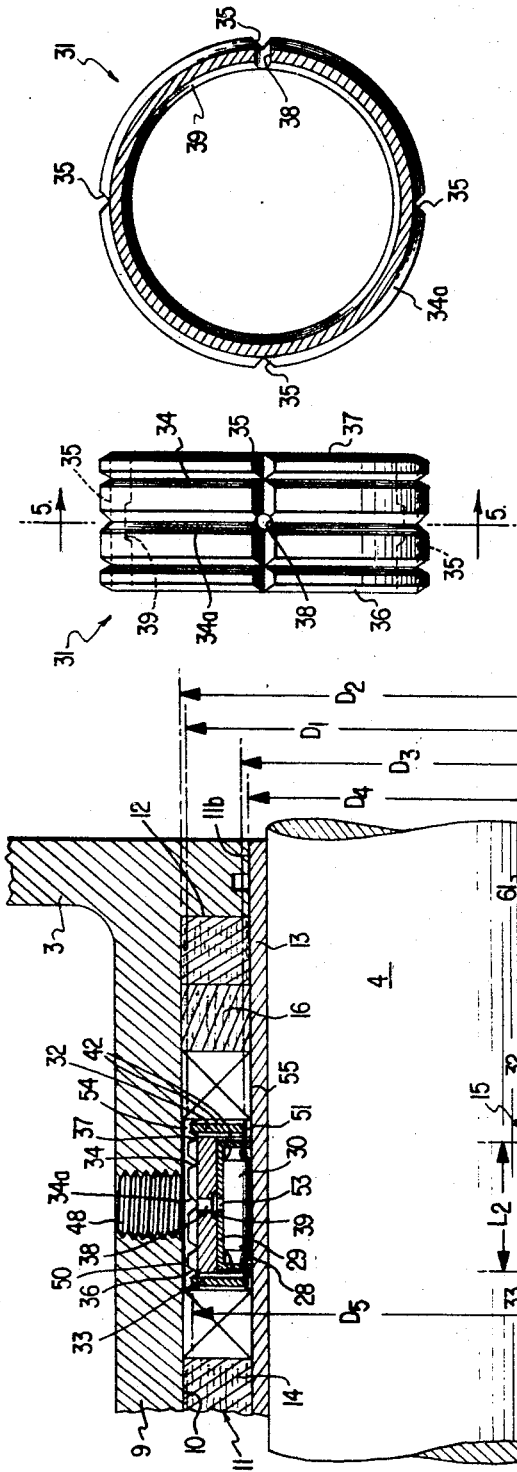
INVENTOR
JOEL M. STOGNER
BY Burns, Doane, Benedict, Swecker & Mathis
ATTORNEYS.

Oct. 28, 1969    J. M. STOGNER    3,474,734
STUFFING BOX FOR A ROTARY PUMP
Filed March 8, 1968    3 Sheets-Sheet 3

INVENTOR
JOEL M. STOGNER

BY Burns, Doane, Benedict, Swecker & Mathis
ATTORNEYS

United States Patent Office 3,474,734
Patented Oct. 28, 1969

3,474,734
STUFFING BOX FOR A ROTARY PUMP
Joel M. Stogner, Duncan, Okla., assignor to Halliburton Company, Duncan, Okla., a corporation of Delaware
Filed Mar. 8, 1968, Ser. No. 711,758
Int. Cl. F04d *29/12;* F16c *33/78*
U.S. Cl. 103—111                                10 Claims

ABSTRACT OF THE DISCLOSURE

A stuffing box for a centrifugal pump including axially aligned packing and roller bearing assemblies interposed radially between a rotary pump shaft and a stuffing box wall. A lubricating system serves to simultaneously lubricate the bearing assembly and the interface between the packing means and a rotary surface carried by the pump shaft.

THE PRIOR ART PROBLEM

Figure 1:
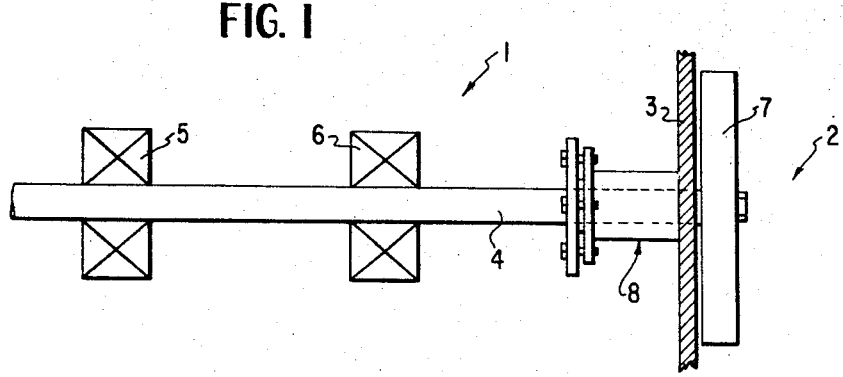

Rotary pumps, such as centrifugal pumps, includes an impeller supported on a rotating shaft within a pumping chamber. Where the shaft passes through the wall of a chamber, a stuffing box is provided. This stuffing box contains packing interposed radially between the shaft and the stuffing box wall. The function of the packing is to prevent leakage of fluid from the pumping chamber around the shaft.

Because of the nature of the dynamic loads imposed on the impeller, there often is a tendency for the shaft to deflect in the vicinity of the pumping chamber, with this deflection still being appreciable where the shaft pasess through the stuffing box. Such deflection induces a degree of shaft "wallowing" which in turn produces an undesired degree of packing wear. Such wear requires excessively frequent replacement of the pump packing and may produce excessive shaft wear.

The problems involved in attempting to control the shaft wallowing problem, in the stuffing box environment, are substantial. The seal must be effectively maintained and rotation of the shaft unimpeded.

At times, the packing in the stuffing box is axially compressed such that attempts to utilize any form of shaft centering means would be expected to interfere with the sealing operation of the packing.

It will also be appreciated that servicing of centrifugal pumps is often performed by relatively unskilled field personnel. Thus attempts to cure shaft wallowing which would engender any significant stuffing box alterations would, of necessity, complicate field servicing procedures and introduce the distinct likelihood of improper servicing by the available unskilled personnel.

OBJECTS AND SUMMARY OF INVENTION

It is a principal object of the invention to provide an improved stuffing box structure which effectively minimizes tendencies for the rotary shaft of a pump to deflect in the area of the packing contained within the stuffing box cavity.

It is also a principal object of the invention to provide for such shaft deflection control in a stuffing box without interfering with the seal provided by the stuffing box packing.

Another object of the invention is to provide such shaft deflection control in a stuffing box concurrent with effective lubrication.

It is also an object of the invention to accomplish such improved shaft deflection control while enhancing the freedom of rotatiton of the shaft within the stuffing box.

In accomplishing these objectives, there is presented, through this invention, a stuffing box for a rotary pump including housing means mounted adjacent a fluid occupied pumping chamber. Wall means in the housing define a passage extending from this pumping chamber. A rotatable shaft supporting a pumping element passes through this passage. Annular packing means is interposed radially between the shaft and the aforesaid wall means. Bearing means, aligned axially with the packing means, is also interposed radially between the shaft and wall means. Mutually convergible end walls of the passage serve to contain and properly position the bearing means and packing means within the passage.

Another independently significant structural aspect of the invention involves a peripherally grooved sleeve which provides a bearing housing, which housing serves to transmit lubricant to the rotatable elements of a bearing and prevents the packing of the stuffing box from exerting axially compressive force on the bearing.

Other combination facets of the invention which are of particular significance, relate to the utilization of pressurized lubricating and flushing systems and uniquely grooved and arranged thrust bearings.

DRAWINGS

In describing the invention, reference will be made to a preferred embodiment shown in the appended drawings.

Figure 2:
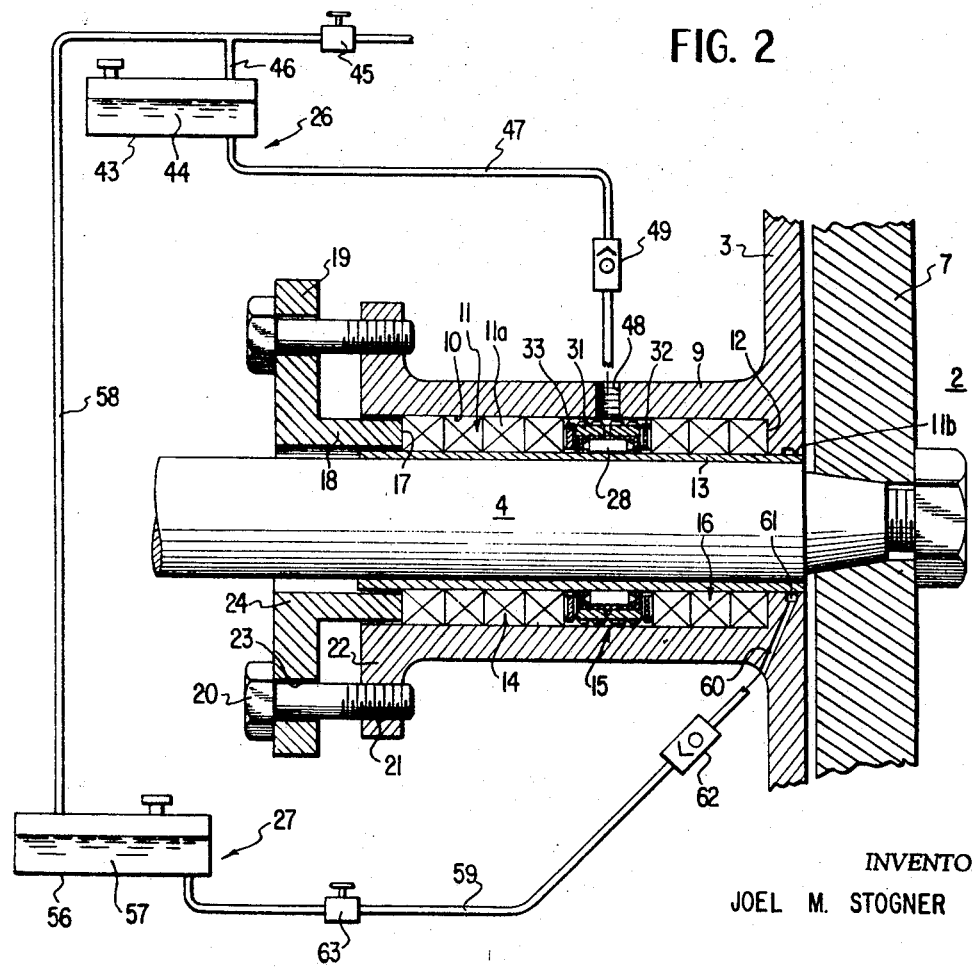
Figure 9:
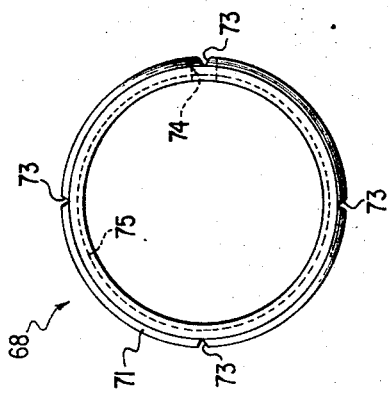
Figure 10:
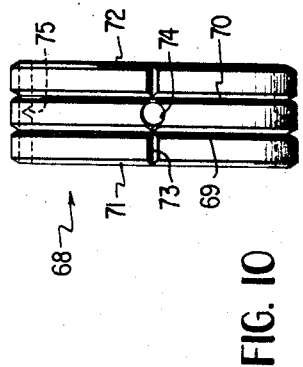
Figure 8:
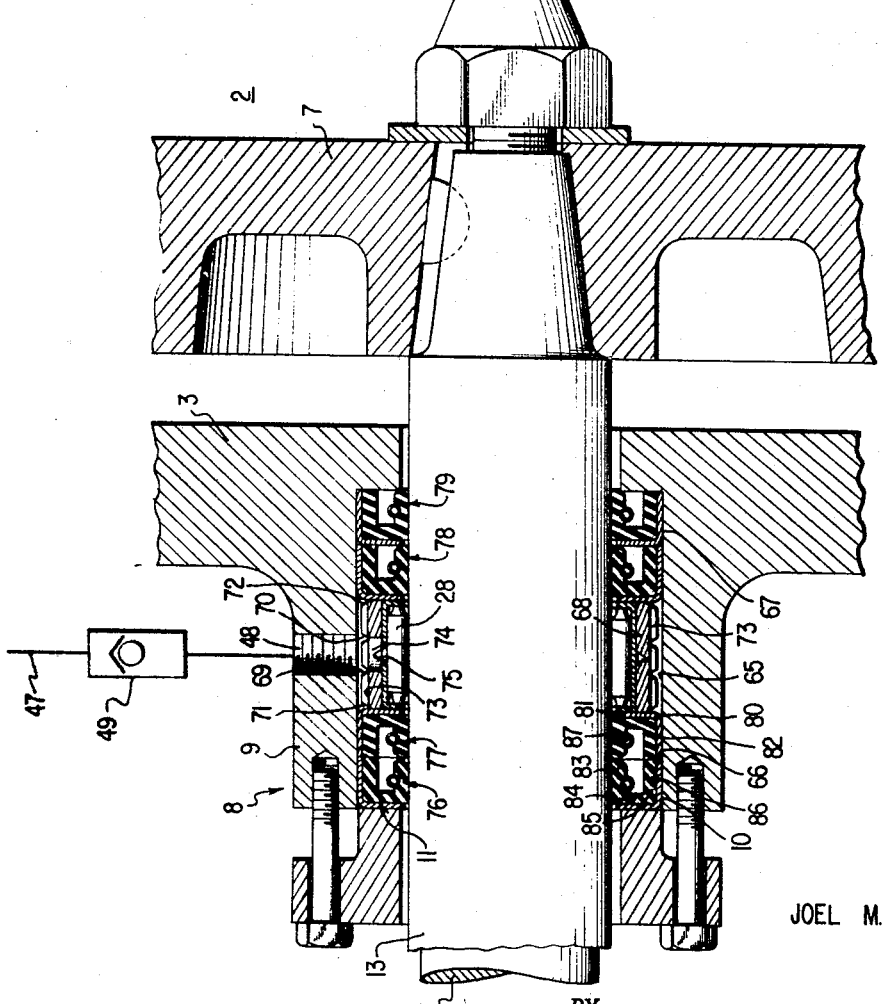

In the drawings:

FIGURE 1 schematically illustrates an overall, partially sectioned view of a centrifugal pump illustrating relationships between the pumping chamber, stuffing box and pumping shaft mounting means;

FIGURE 2 provides an enlarged, longitudinally sectioned view of the stuffing box of the FIGURE 1 assembly and further illustrates, in schematic form, a lubricating and flushing system associated with the stuffing box;

FIGURE 3 provides an enlarged longitudinally sectioned view of a bearing portion of the FIGURE 2 stuffing box;

FIGURE 4 provides a still further enlarged elevational view of a bearing housing sleeve incorporated in the FIGURE 3 bearing assembly;

FIGURE 5 provides a transverse sectional view of the FIGURE 4 sleeve as viewed along the section line 5—5 of FIGURE 4;

FIGURE 6 provides a plan view of one of the two bearing housing, thrust washers shown in the FIGURE 3 assembly with these washers being illustrated in an enlarged format;

FIGURE 7 provides an end elevational view of the FIGURE 6 washer;

FIGURE 8 illustrates a modified form of the stuffing box structure of the present invention;

FIGURE 9 provides an enlarged elevational view of a bearing retaining and lubricant transmitting sleeve incorporated in the FIGURE 8 assembly; and FIGURE 10 provides a side elevational view of the sleeve shown in FIGURE 9, with this sleeve rotated 90° to provide an illustration of the end section of a radial port of the sleeve with longitudinally and circumferentially extending sleeves formed on the sleeve outer periphery.

OVERALL PUMP STRUCTURE

FIGURE 1 schematically illustrates a centrifugal pump assembly 1 including a pump chamber 2, a pump chamber housing 3, and a pump drive shaft 4. As will be understood, pump drive shaft 4 extends from a conventional, rotary drive means (not shown). Drive shaft 4 is supported for rotation about its longitudinal axis by conventional bearing mounts 5 and 6.

Rotary shaft 4 supports a centrifugal, fluid pumping impeller 7 within the pump chamber 2. Pump impeller 7 is operable to pump fluid contained within the chamber 2 out of this chamber under pressure.

A stuffing box 8 is mounted on the pumping chamber wall 3. Stuffing box 8 provides a seal-like connection between the shaft 4 and the pumping chamber 2. This connection allows the shaft, which passes telescopingly through the stuffing box, to rotate while preventing an outflow of fluid from the chamber 2 along the drive shaft 4.

STUFFING BOX STRUCTURE

FIGURE 2 illustrates principal components of the stuffing box 8. Stuffing box 8 includes a generally tubular wall portion 9 which, as shown in FIGURE 2, may comprise an integral lateral extension of pump housing wall 3. Interior wall means 10 of the stuffing box 8 define a passage 11 extending laterally outwardly of, and communicating with, the pumping chamber 2.

The end of the passage 11, adjacent the pump chamber 2, is partially closed by an annular end wall 12.

As shown in FIGURE 2, the shaft 4 passes through the passage 11. As there shown, the outer periphery of shaft 4 may be protected by a wear sleeve 13 which is fixedly secured to the shaft periphery. Thus sleeve 13 may be viewed as a portion of the shaft 4.

In the annulus portion 11a of the passage 11, i.e., the passage portion interposed radially between the wear sleeve 13 and the stuffing box wall 10, there is located a composite, axially slidable, assembly comprising first annular packing means 14, bearing means 15 and second annular packing means 16.

Packing means 14 and 16 may comprise axially compressible and radially expansible packing means such as conventional rope packing, as schematically shown in FIGURE 2. Alternatively this packing may be provided by conventional annular disc-type, radially expansible, packing units.

Regardless of the nature of the packing, each of the packing means 14 and 16 as well as the bearings means 15 is axially slidable over the shaft 4 and through the passage portion 11a. The term "slidable" is here employed in a broad sense to encompass axial movement which would be involved in the installation or removal of rope-type packing in the passage portion 11a, as well as the movement which such packing undergoes when it is being axially compressed and radially expanded.

As will be further appreciated, with the packing means 14 and 16 and the bearings means 15 being disposed in axial alignment, these packing and bearings units may undergo this sliding movement more-or-less as a unitary element.

The bearing means functions as a force-transmitting mechanism by means of which axial force may be transmitted from the packing means 14 to the packing means 16. The manner in which this force-transmission is effected, without interfering with the friction-reducing properties of the bearing means 15, will become apparent in the subsequent detailed discussion of the structure of the bearing means itself.

The outermost end of the passage 11a is closed by a movable end wall 17, defined by a sleeve-like portion 18 of a stuffing box cap 19. Cap 19 is adapted to be secured in place by one or more threaded fasteners 20. Each of these threaded fasteners threadably engages a female threaded portion 21 of a stuffing box housing flange 22. Each such threaded fastener 20 may pass freely through an aperture 23 of a stuffing box cap flange 24.

By screwing the threaded fasteners 20 into the threaded coupling means 21, the head portions 25 of the fasteners 20 will exert a compressive force on the cap 19, effective to move the wall 17 toward the wall 12. The convergence of the walls 12 and 17 will serve to effect the axial spacing of these walls necessary to maintain the packing means 14 and 16 and the bearing means 15 in a properly supported, contiguous relationship.

As will also be appreciated, this convergence of the end walls 12 and 17 will also serve to axially compress the packing means 14 and 16 so as to induce their radial expansion. Such radial expansion, of course, will bring the packing means into radially compressive engagement with the wall means 10 and the wear sleeve 13 so as to provide a desired packing relationship between the stuffing box and the shaft 4.

As will also be appreciated, the axially slidable character of the bearing means 15 relative to the shaft 4 and the wall 10, enables packing compressing, axial force to be transmitted from the packing means 14 to the packing means 16.

Stuffing box 8 also includes a lubricating mechanism 26 operable to deliver lubricant to the passage 11a radially adjacent the bearing means 15.

Stuffing box 8 also includes a flushing system 27 operable to deliver flushing fluid to the passage 11a in the interface zone 11b between the end wall 12 and the wear sleeve 13, i.e., the zone of passage 11 immediately adjacent the fluid occupied pumping chamber 2.

Structural details of the lubricating system 26 and the flushing system 27 will be subsequently described.

STRUCTURAL DETAILS OF BEARINGS MEANS 15

Structural details of bearing means 15 are shown in FIGURES 3 through 7.

As shown in FIGURE 3, bearing means 15 includes an annular, "needle" or roller bearing assembly 28. Assembly 28 comprises a bearing cage 29 supporting a plurality of rigid, needle bearings 30. These needle bearings are disposed circumferentially about the wear sleeve 13 and engage the wear sleeve 13. The needle bearing elements 30, of course, are rotatable about their longitudinal axes which extend parallel to the axis of rotation of the shaft 4.

As will be appreciated, other bearing assemblies might be employed where the needle bearings 30 are replaced by other forms such as ball bearings.

The bearing assembly 28 is mounted for axial slidable movement on the wear sleeve 13 and is enclosed by a housing defined by a sleeve 31 and annular disc-like, thrust bearings or end walls 32 and 33, respectively. The axial length L–1 of the sleeve 31 slightly exceeds the axial length L–2 of the bearing cage 29.

The outer diameter D–1 of the sleeve 31 is slightly less than the inner diameter D–2 of the wall 10. The inner diameter of the sleeve 31 is related to the outer diameter of the bearing cage 29 so as to provide an interference fit between the bearing assembly 28 and the sleeve 31.

Each of the thrust bearings or end walls 32 and 33 is identically configured. The inner diameter D–3 of each such end wall slightly exceeds the outer diameter D–4 of the wear sleeve 13. The outer diameter D–5 of each of these end walls may be slightly less than the diameter D–1 of the sleeve 31.

As shown in FIGURE 4, the outer periphery of the sleeve 31 is provided with a series of axially spaced and circumferentially extending grooves 34. A series of longitudinally extending and circumferentially spaced grooves 35 is also formed on the outer periphery of the sleeve 31.

The longitudinal grooves 35 intersect the circumferential grooves 34 so as to provide a gridlike groove network, with groove portions 34 and 35 being in fluid communicating relationship.

The ends of the outer periphery of the sleeve 31 are provided with chamfer portions 36 and 37 which intersect the longitudinal grooves 35.

One external groove 34a may be located more or less centrally of the sleeve 31. One or more radial passages 38 extends radially inwardly from this centrally located, circumferential groove 34a and communicates with a circumferential groove 39 formed on the inner periphery of the sleeve 31.

With each of the thrust bearings 32 and 33 being identical, structural details of the disc 32 only will be described with reference to FIGURES 6 and 7.

Disc 32 comprises an annular, disclike, washer including generally planar parallel sides 40 and 41. Each side 40 and 41 is provided with a plurality of circumferentially spaced and radially extending grooves 42.

With the end walls 32 and 33 disposed in abutting relationship with opposite ends of the sleeve 31, as shown in FIGURE 3, these elements cooperate to define a bearing housing and provide an annular, bearing receiving cavity. Within this cavity the roller bearing assembly 28 is supported in nonrotatable relationship with the sleeve 31 (by virtue of the previously noted interference fit). The compressive interaction of the walls 12 and 17, transmitted through the packing means 14 and 16 to the thrust bearings 32 and 33, causes these thrust bearings to compressively engage the sleeve 31 so as to prevent rotation of this sleeve. The rotation of the sleeve being thus prevented, rotation of the interference fitted bearing assembly 28 is also prevented (or at least effectively deterred).

Significantly, this compressive interaction between the packing means, the sleeve 31 and the thrust bearings 32 and 33 is accomplished without imposing axial compressive force on the bearing assembly 28. This results from the axial length of the sleeve 31 exceeding the axial length of the assembly 28.

At this point, it will be noted that by virtue of the previously described diameter relationships, the bearing housing provided by the sleeve 28 and the thrust bearings 32 and 33 is free to undergo quite limited, but nevertheless discernible, radial movement. This limited movement insures the axial slidability of the bearing means 15 yet is of such a small magnitude as to enable the sleeve 31 and the bearing means 28 to effectively impede radial deflection of the shaft 4 within the stuffing box 8.

LUBRICATION SYSTEM

Lubrication system 26 includes a reservoir 43 operable to contain and pressurize a body of fluid lubricant 44. Pressurized air, under the control of a conventional pressure regulator 45, may be delivered by conduit means 46 to the reservoir 43 so as to effect pressurization of the lubricant 44. The pressurized lubricant material is transmitted through conduit means 47 to an aperture 48 in the stuffing box 8 disposed radially opposite the sleeve 31 of the bearing means 15. The port 48 is preferably radially aligned with the central sleeve groove 34a. A check valve 49 in conduit means 48 serves to permit the passage of lubricant from the reservoir 43 to the bearing means 15 while preventing a flow of fluid from the vicinity of the bearing means 15 to the reservoir 43.

Pressurized lubricant, such as lubricating oil, delivered to the port 48 may be annularly distributed about the outer periphery of the sleeve 31 to some extent by the annular clearance gap 50 which may exist between the sleeve 31 and the wall 10. This distribution, however, is materially facilitated by the interlacing network of grooves 34 and 35 formed on the outer periphery of the sleeve 31. Even if the sleeve 31 should be axially displaced from the centered position shown in FIGURE 2, one groove 34 or a chamfer 36 or 37 would communicate with port 48 so as to enable lubricant to flow through the groove network.

This groove network serves to transmit lubricant axially away from the port 48 toward each of the thrust bearings 32 and 33. Lubricant thus transported to each of these thrust bearings moves radially through the thrust bearing grooves 42 to an annular clearance zone 51 existing between each of the thrust bearings and the wear sleeve 13. Lubricating fluid is thus free to move from the gap 51 through the underside of the bearing cage 29 into direct lubricating contact with the roller elements 30. The fluid communication between the grooves 42 and the network of sleeve grooves 34 and 35 is facilitated by the sleeve chamfers 36 and 37. Further facilitation of this communication may be provided by thrust bearing chamfer portions formed on the outer edges of the thrust bearing 32 and 33 facing the sleeve 31. One such chamfer 52 formed on thrust bearing 32 is shown in FIGURES 3 and 7.

Another flow path for lubricant material leading to the roller bearing elements 30 is provided by the central groove 34a (or the overall network of grooves 34 and 35 and chamfers 36 and 37 if the sleeve is not centered), the radial passage means 38 and the internal sleeve groove 39. Lubricating fluid entering the port 48 will flow through the groove 34a (or the groove network), down through the port means 38 and into the internal sleeve groove 39. Fluid within the groove 39 will pass radially inwardly to the bearing elements 30 by way of one or more bearing cage apertures 53. As shown in FIGURE 3, such apertures 53 are radially aligned with the sleeve groove 39.

Thus, by virtue of parallel flow paths, lubricating fluid is supplied to the outer periphery of the bearing elements 30 and to each of the opposite axial ends of these bearing elements.

The annular gap 54 which exists between each of the thrust bearings 32 and 33 and the stuffing box wall 10 provides a vehicle for transmitting lubricant material to the interfaces between the packing means 14 and 16 and the wear sleeve 13.

Lubricant transmitted along the outer periphery of the sleeve 31 to each gap 54 passes radially inwardly toward the wear sleeve 13 along the interface between the packing means and the thrust bearing.

Thus, as shown in FIGURE 3, in connection with thrust bearing 32, lubricant material will move from the annular gap 54 radially downwardly between the rightmost side of the thrust bearing 32 and the leftmost side of the packing means 16 to the interface 55 between the packing means 16 and the wear sleeve 13. This transmittal of lubricant to this interface may be facilitated by the radially extending grooves 42 formed on the right most side of the thrust bearing 32, when the apparatus is viewed as shown in FIGURE 3.

An additional flow of lubricant to the interface 55 may be provided by lubricant flowing to the right into interface 55 from the previously discussed gap 51.

Desirably, the packing means 16 is of such limited effectiveness as to allow some controlled leakage of lubricant along the interface 55 toward the pump chamber 2. This limited leakage, which provides a lubricant flushing action, may be provided by limiting the axial length of the packing means 16. Thus, as shown in FIGURE 2, the axial length of the packing means 16 is somewhat less than the axial length of the packing means 14. This allows the packing means 16 to permit some limited lubricant leakage into the pumping zone 2, while the packing means 14, although permitting some lubricant flow between itself and the wear shaft 13, blocks an ultimate outflow of lubricant beyond the leftmost extremity of the packing means 14.

STRUCTURAL DETAILS OF FLUSHING SYSTEM

Flushing system 27 is schematically illustrated in FIGURE 2. The function of flushing system 27 is to provide a barrier of pressurized fluid in the vicinity of end wall 12 which will serve to prevent fluid from the pumping chamber 2 from entering the passage means 11. Obviously, the pressure of flushing fluid applied to this zone will be limited so as to permit the previously described flow of lubricant along the interface 55 between bearing means 16 and wear sleeve 13.

Flushing system 27 comprises a closed reservoir 56 operable to contain a pressurized body of flushing fluid 57. Flushing fluid 57 may comprise a fluid medium similar to that contained in reservoir 2, or may comprise other materials such as water, oil etc.

The pressurization of the flushing fluid within the reservoir 56 may be effected by conduit means 58 which serves to transmit pressurized air to the interior of the reservoir 56 under the control of pressure regulator 45.

Pressurized flushing fluid is transmitted from reservoir 56 by conduit means 59. Conduit means 59 communicates with a passage 60 formed in stuffing box 8. Passage 60 terminates in an annular groove 61 encircling the wear sleeve 13, radially between the wall 12 and the wear sleeve 13. A check valve 62 serves to permit this flow of flushing fluid to the groove 61 while preventing a backflow of fluid from the groove 61 to the reservoir 56.

A pressure regulator 63 may be incorporated in conduit means 59 so as to regulate the pressure of fluid in the groove 61. This pressure regulation serves to permit the flow of lubricant pressure along the interface 55 while, simultaneously, preventing a flow of fluid from the pumping chamber 2 into the passage 11.

ALTERNATIVE EMBODIMENT OF STUFFING BOX

FIGURES 8, 9 and 10 illustrate an alternative form of a stuffing box embodying significant aspects of the invention.

As shown in FIGURE 8, a modified bearing means 65 is interposed axially between a first pair 66 of conventional grease seals and a second pair 67 of conventional grease seals.

Modified bearing means 65 includes the previously noted, caged roller bearing assembly 28 disposed immediately adjacent the wear sleeve 13. A modified sleeve 68 is telescoped over the bearing means 28 and is disposed radially between the bearing means 28 and the wall means 10.

Modified sleeve 68 has an internal diameter so related to the outside diameter of the bearing means 28 as to provide an interference fit between the components 28 and 68 and thus tends to prevent relative rotation between these components.

Preferably the sleeve 68 has an axial length exceeding the axial length of the bearing means 28, for the reason previously discussed, i.e., to prevent the packing means 66 and 67 from compressing the bearing unit 28.

Sleeve 68 includes a pair of generally centrally located, circumerentially extending grooves 69 and 70 as well as end chamfers 71 and 72. A plurality of longitudinally extending and circumferentially spaced grooves 73 are also formed on the exterior of the sleeve 68 and intersect the grooves 69 and 70 and the chamfers 71 and 72.

Thus the chamfers 71 and 72, the grooves 69 and 70, and the longitudinal groove 73 define a gridlike, mutually communicating lubricant transmitting network, even where there is no appreciable or discernible clearance between the outer diameter of the sleeve 68 and the diameter of the wall means 10.

A radial port 74 intersects the sleeve 68 at the junction of one of the longitudinal grooves 73 and the circumferential grooves 69 and 70. The diameter of port 74 is such as to cause the port to intersect not only the groove 73 but the grooves 69 and 70 as well.

Preferably, the sleeve 68 is disposed within the passage 11 so that the grooves 69 and 70 are aligned with the lubricant supplying port 48, and with the sleeve port 74 more or less radially aligned with the stuffing box port 48.

With this optimum alignment, lubricant will flow directly from the stuffing box port 48 and through the sleeve port 74 to the outer periphery of the bearing assembly 28.

A centrally located groove 75, extending circumferentially about the interior wall of the sleeve 68, intersects and thus communicates with the sleeve port 74. This groove 75 is radially aligned with the bearing cage port 53 previously described. Thus, lubricant fluid will flow from the sleeve port 74 either directly into the bearing cage port 53 or indirectly through the sleeve groove means 75 into the bearing port 53 so as to lubricate the previously-described roller bearing elements 30.

It is important to here appreciate that the sleeve 68 may be axially misaligned to a substantial degree, in either axial direction with reference to the port 48, without destroying the lubricating system.

The spacing between the grooves 69 and 70, the spacing between the groove 70 and the chamfer 72, and the spacing between the groove 69 and chamfer 71 is such as to insure that if any portion of the sleeve 68 is aligned with the port 48, an effective lubricant flow path is provided.

For example, if the sleeve 68 should be displaced to the right, as shown in FIGURE 8, so as to bring the chamfer 71 into alignment with the port 48, lubricant would flow into the chamfer 71 and then through the longitudinal groove 73 to the intercommunicating grooves 69 and 70 and the main feed port 75.

A similar flow path would result by way of chamfer 72 if the sleeve should be displaced to the left, viewing the apparatus as shown in FIGURE 8.

The diameter of port 48 is such as to insure communication between this port and at least one of the sleeve chamfers or circumferential grooves.

Each of the grease seals in the assembly 66 and 67 are identical. Each seal may comprise, for example, a structure such as grease seal Model No. CR–14881 manufactured by Chicago Rawhide Manufacturing Company of Chicago, Ill.

As shown in FIGURE 8, four such grease seals 76, 77, 78 and 79 are provided.

Each such seal, as exemplified by the seal 77, comprises an annular disclike structure including a retaining wall 80 having an L-shaped cross section defined by a radially extending wall portion 81 and a longitudinally extending wall portion 82. Wall portion 82 is disposed adjacent a stuffing box wall 10, while radial wall 81 extends from the wall 82 toward the wear sleeve 13. As will be appreciated, some radial clearance will be provided between the inner diameter of the wall means 81 and the wear sleeve 13.

As shown in FIGURE 8, the grease seals are arranged with the wall means 81 of the seals 77 and 78 facing and abutting the ends of the sleeve 68. In a sense, the wall means 81 of these two grease seals may be viewed as disc-like thrust bearings engaging the sleeve ends.

Each of the grease seals includes an elastomeric seal element 83 having a generally U-shaped cross section defined by two radially spaced legs 84 and 85 extending away from a connecting end wall 86. This wall 86 lies adjacent the housing wall 81. A coil spring 87 may engage the annular leg 84 so as to bias this leg 84 into sealing, circumferentially embracing, engagement with the shaft 13. Housing wall 80 is disposed in limited interfering fit engagement with the stuffing box wall 10 so as to provide a seal between the outer periphery of the grease seal and the stuffing box.

Each of the seals 78, 79 of packing means 67, interposed axially between the bearing means 65 and the pump chamber 2, is aligned with the leg portions 84 and 85 extending away from the bearing means toward the pumping chamber 2. In this fashion, the elastomeric seal elements of this packing means 67 serve to prevent the outflow of pumping fluid from the chamber 2 along the shaft means 4, which includes the wear sleeve 13. However, these seal means will allow a limited flow of lubricant from the bearing means toward the pump chamber 2.

The grease seals 76 and 77 of packing means 66 are disposed in oppositely oriented relationship, i.e., the legs 84 and 85 of seal 77, which are located immediately adjacent bearing means 65, extend away from this bearing means while the elastomeric legs of seal 76 extend toward the bearing means 65. Thus, the seal 76 serves to prevent an outflow of lubricant from the bearing means 65 out of the stuffing box. The grease seal 77 permits a limited flow of lubricant along the wear sleeve 13 away from bearing means 65 while preventing an inflow of air along the sleeve 13 into the bearing means 65 from the capped end of the stuffing box 8.

As will be appreciated, the flow of lubricant from the bearing means 65, in opposite axial directions away from the bearing means 65, to the interfaces between packing means 66 and 67 and the wear sleeve 13, results from lubricating fluid flowing from the vicinity of roller elements 30. This flow takes place along the wear sleeve 13 and passes axially through the clearance between the wall means 81 of the grease seals 77 and 78 and the wear sleeve 13.

The stuffing box cap 18 may compressively engage the assembly of axially aligned packing means 66, bearing means 65 and packing means 67 so as to cause the seals 77 and 78 to compressively engage the sleeve 68. This limited compressive engagement will prevent rotation of the sleeve 68. The interference fit between the sleeve 68 and the roller bearing unit 28, coupled with this compressive engagement, will stabilize the roller bearing unit against rotation. With the axial length of the sleeve 68 exceeding the axial length of the bearing unit 28, this compressive engagement will have no deleterious effect on the bearing properties of the roller bearing unit 28.

As will also be appreciated, rotation of the bearing means 65 may be impeded by providing a limited interference fit between the sleeve 68 and the stuffing box wall 10.

SUMMARY OF ADVANTAGES AND SCOPE OF INVENTION

The unique incorporation of a bearing assembly in combination with the packing means of a stuffing box, enables the packing function of the stuffing box to be accomplished while stabilizing the shaft of a pump against deflection.

Significantly, this is accomplished without altering to any substantial degree the basic and conventional structure of the stuffing box.

The limited free floating nature of the housing portion of the bearing means facilitates the axial movement of the bearing means necessary for axial force transmitting purposes, facilitates the slidable assembly of the bearing and packing means within the passage 11, and facilitates the distribution of lubricant through the multiple flow paths previously described.

To some extent, the limited floating tendencies of the bearing housing are offset by the encircling body of pressurized lubricant surrounding the sleeve 31.

Significantly, the bearing housing serves to enable the bearing assembly 28 to restrain the shaft 4 against lateral deflection without interfering with the friction reducing action of the rotatable bearing elements 30. Thus, shaft deflection is controlled while simultaneously improving the bearing relationship between the shaft 4 and the stuffing box 8.

The unique groove network provided by the sleeve 31 and the disclike thrust bearings provides multiple flow paths leading to different portions of the bearing assembly and to the interfaces between the packing means and the wear shaft so as to effectively lubricate the entire apparatus.

Significantly, the structure of the thrust bearings and the sleeve of the bearing housing is such as to absolutely prevent any mode of assembly which would be improper, i.e., the sleeve can be turned end-for-end and the thrust bearings reversed without producing any alternation of the resultant bearing housing structure. Further, the distribution of lubricant is not dependent on precise sleeve alignment.

The sleeve and packing seals of the alternative embodiment provide for effective bearing and packing lubrication, even if the bearing assembly is misaligned, and control the flow of air and lubricant and pumped fluid.

The combination of these advantages with the fluid barrier provided by the flushing system yields enhanced lubrication of the stuffing box concurrent with the avoidance of contamination of the lubricant by the material being pumped. Where abrasive materials are being pumped, the flushing fluid barrier effectively prevents abrasive material from moving into the stuffing box where it would engender excessive wear between the wear sleeve and the packing means.

In describing the invention, reference has been made to a preferred embodiment. However, those skilled in the centrifugal pump art and familiar with this disclosure may well recognize additions, deletions, substitutions or modifications which would fall within the purview of the invention as defined in the appended claims.

I claim:
1. A stuffing box for a rotary pump, said stuffing box comprising:
  housing means mounted adjacent a fluid occupied pumping chamber;
  wall means in said housing defining a passage extending from a fluid occupied pumping chamber;
  a rotatable shaft supporting a pumping element and passing through said passage;
  annular packing means interposed radially between said shaft and said wall means;
  bearing means interposed radially between said shaft and said wall means;
  said bearing means including;
    a plurality of rotatable bearing members dispersed circumferentially about said shaft, and
    a bearing cage radially confining said bearing members;
  said packing means and said bearing means being mounted in axially aligned relationship for axial movement along said shaft;
  mutually convergible first and second wall means defining opposite axial ends of said passage;
  means for selectively urging one of said wall means toward the other of said wall means; and
  bearing housing means mounted in said wall means, encircling said bearing cage, independent of said bearing cage, and operable to substantially prevent the transmission of force from said packing means through said bearing cage, longitudinally of said shaft.

2. A stuffing box for a rotary pump, said stuffing box comprising:
  housing means mounted adjacent a fluid occupied pumping chamber;
  wall means in said housing defining a passage extending from a fluid occupied pumping chamber;
  a rotatable shaft supporting a pumping element and passing through said passage;
  first annular packing means interposed radially between said shaft and said wall means;
  second annular packing means, displaced axially from said first packing means along said shaft, and interposed radially between said shaft and said wall means;
  bearing means interposed axially between said first and second packing means and radially between said shaft and said wall means;
  said bearing means including;
    a plurality of rotatable bearing members dispersed circumferentially about said shaft, and
    a bearing cage radially confining said bearing members;
  said first and second packing means and said bearing means being mounted in axially aligned relationship for axial movement along said shaft;
  mutually convergible first and second wall means engaging opposite axial ends of said aligned first and second packing means;
  means for selectively urging one of said wall means toward the other of said wall means;

sleeve means telescopingly encircling said bearing means and operable to transmit axial force from said first packing means to said second packing means; and said sleeve means defining bearing housing means mounted in said wall means, encircling said bearing cage, independent of said bearing cage, and operable to substantially prevent the transmission of force from said first packing means through said bearing cage, to said second packing means.

3. A stuffing box as described in claim 2 further including:

a reservoir containing lubricant material;

conduit means extending from said reservoir to said passage, radially adjacent said bearing means;

check valve means operable to permit lubricant material to flow from said reservoir to said passage while preventing a flow of material from said passage to said reservoir; and means operable to pressurize lubricant material within said reservoir to cause said lubricant to flow through said conduit means to said passage;

said second packing means being interposed axially between said bearing means and said pumping chamber and operable to permit a limited flow of lubricant material from the vicinity of said bearing means, between said shaft and second packing means, and toward said pumping chamber.

4. A stuffing box for a rotary pump, said stuffing box comprising:

housing means mounted adjacent a fluid occupied pumping chamber;

wall means in said housing defining a passage extending from a fluid occupied pumping chamber;

a rotatable shaft supporting a pumping element and passing through said passage;

first annular packing means interposed radially between said shaft and said wall means;

second annular packing means, displaced axially from said first packing means along said shaft, and interposed radially between said shaft and said wall means;

bearing means interposed axially between said first and second packing means and radially between said shaft and said wall means, said bearing means including a plurality of rigid, rotatable, friction reducing members disposed about the periphery of said shaft;

said first and second packing means and said bearing means being mounted in axially aligned relationship for axial movement along said shaft;

mutually convergible first and second wall means engaging opposite axial ends of said aligned first and second packing means;

means for selectively urging one of said wall means toward the other of said wall means;

sleeve means telescopingly encircling said bearing means and operable to transmit axial force from said first packing means to said second packing means;

a first reservoir containing lubricant material;

conduit means extending from said first reservoir to said passage, radially adjacent said bearing means;

check valve means operable to permit lubricant material to flow from said first reservoir to said passage while preventing a flow of material from said passage to said first reservoir; and means operable to pressurize lubricant material within said first reservoir to cause said lubricant to flow through said conduit means to said passage;

said second packing means being interposed axially between said bearing means and said pumping chamber and operable to permit a limited flow of lubricant material from the vicinity of said bearing means, between said shaft and second packing means, and toward said pumping chamber;

a second reservoir containing flushing material;

second conduit means extending from said second reservoir to said passage axially between said bearing means and said pumping chamber;

check valve means operable to permit flushing material to flow from said second reservoir to said passage while preventing a flow of flushing material from said passage to said second reservoir; and means operable to pressurize flushing material within said second reservoir to cause said flushing material to flow through said second conduit means to said passage.

5. A stuffing box as described in claim 4:

wherein said sleeve means includes;

a plurality of circumferentially extending grooves encircling the outer periphery of said sleeve means, and a plurality of circumferentially spaced and longitudinally extending grooves intersecting and communicating with said circumferentially extending grooves on the outer periphery of said sleeve means;

wherein said stuffing box further includes a first annular end wall having a pair of planar parallel sides, with one side engaging one end of said sleeve means, said first end wall having;

a plurality of circumferentially spaced and radially extending grooves formed on one side, facing said sleeve means, and disposed in fluid communicating relation with the grooves of said sleeve means, and a second plurality of circumferentially spaced and radially extending grooves formed on the other planar side;

wherein said stuffing box also includes a second annular end wall having a pair of planar and parallel sides, with one side engaging the other end of said sleeve means, said second wall having;

a plurality of circumferentially spaced and radially extending grooves formed on one planar side, facing said sleeve means, and disposed in fluid communicating relation with the grooves of said sleeve means, and a second plurality of circumferentially spaced and radially extending grooves formed on the other planar side of said end wall;

said annular end walls cooperating with said sleeve means to define an annular bearing receiving cavity; and means operable to deliver a bearing lubricant to the grooves of said sleeve means and annular end walls, with the communicating grooves of said sleeve means and end walls being operable to transmit said lubricant to said cavity.

6. A stuffing box for a rotary pump, said stuffing box comprising:

housing means mounted adjacent a fluid occupied pumping chamber;

wall means in said housing defining a passage extending from a fluid occupied pumping chamber;

a rotatable shaft supporting a pumping element and passing through said passage;

first axially compressible and radially expansible, annular packing means interposed radially between said shaft and said wall means;

second axially compressible and radially expansible, annular packing means, displaced axially from said first packing means along said shaft, and interposed radially between said shaft and wall means;

bearing means interposed axially between said first and second packing means and radially between said shaft and said wall means;

said bearing means including;

a plurality of rotatable bearing members disposed circumferentially about said shaft, and a bearing cage radially confining said bearing members;

said first and second packing means and said bearing means being mounted in axially aligned relationship for axial movement along said shaft;

mutually convergible first and second wall means engaging opposite axial ends of said aligned first and second packing means;

means for selectively urging one of said wall means toward the other of said wall means to cause axial compression and radial expansion of each of said first and second packing means;

force transmitting sleeve means telescopingly encircling said bearing means, exceeding the axial length of said bearing means, and operable to transmit axial force from said first packing means to said second packing means while preventing said first and second packing means from exerting axially directed, compressive force on said bearing means; and said sleeve means defining bearing housing means mounted in said wall means, encircling said bearing cage, independent of said bearing cage, and operable to substantially prevent the transmission of force from said first packing means through said bearing cage to said second packing means.

7. A bearing assembly comprising:

annular bearing means;

said bearing means including;
a plurality of rotatable bearing members operable to be dispersed circumferentially about a shaft, and a bearing cage radially confining said bearing members;

sleeve means telescopingly receiving said bearing means and frictionally engaged with the outer periphery of said bearing means;

first annular wall means engaging one end of said sleeve means;

second annular wall means engaging another end of said sleeve means;

said first and second annular wall means being spaced a distance exceeding the length of said bearing means;

packing means engaging each of said first and second wall means and operable to prevent rotation of said annular end wall means, with said annular end wall means engaging said sleeve means so as to prevent rotation of said sleeve means, and with the frictional engagement between said sleeve means and said bearing means impeding rotation of said bearing means; and lubricant supplying means operable to convey lubricant through said sleeve means to said bearing means and additionally convey lubricant between said sleeve means and each of said end wall means to said bearing means;

said sleeve means defining bearing housing means encircling said bearing cage, independent of said bearing cage, and operable to substantially prevent the transmission of force from said packing means through said bearing cage, longitudinally of said shaft.

8. A bearing housing and lubricating assembly comprising:

sleeve means including;
groove means formed on the outer periphery of said sleeve means a first annular end wall having;
groove means, facing said sleeve means, and disposed in fluid communicating relation with the groove means of said sleeve means;

a second annular end wall having;
groove means facing said sleeve means and disposed in fluid communicating relation with the groove means of said sleeve means;

said end walls cooperating with said sleeve means to define an annular bearing receiving cavity; and means operable to deliver a bearing lubricant to the grooves of said sleeve means.

9. A bearing assembly comprising:

housing means;

wall means defining a passage extending at least partially through said housing means;

a rotary shaft passing through said passage;

bearing means encircling said shaft and interposed radially between said shaft and said wall means in said passage;

a bearing housing and lubricating transmitting sleeve interposed radially between said bearing means and said wall means;

said sleeve means including;
a plurality of circumferentially extending, lubricant transmitting, passage means,
a plurality of longitudinally extending lubricant transmitting, passage means intersecting said circumferentially extending passage means, and
port means extending radially through said sleeve means and disposed in fluid communicating relationship with said circumferentially extending and longitudinally extending groove means; and means operable to transmit pressurized lubricant to said circumferentially and longitudinally extending groove means.

10. A stuffing box assembly comprising:

housing means;

wall means defining a passage extending at least partially through said housing means and communicating with a pumping chamber;

rotary shaft means passing through said passage and supporting a pumping element in said chamber;

bearing means encircling said shaft means and interposed radially between said shaft means and said wall means in said passage;

a bearing housing and lubricant transmitting sleeve interposed radially between said bearing means and said wall means;

said sleeve means including;
a plurality of circumferentially extending, lubricant transmitting, passage means,
a plurality of longitudinally extending, lubricant transmitting, passage means intersecting said circumferentially extending passage means, and
port means extending radially through said sleeve means and disposed in fluid communicating relationship with said circumferentially extending and longitudinally extending groove means;

means operable to transmit pressurized lubricant to said circumferentially and longitudinally extending groove means;

first seal means engaging one end of said sleeve means, interposed axially between said sleeve means and said chamber and supporting a first elastomeric sealing element, said first sealing element having a U-shaped cross section and including a first leg portion engaging said wall means and a second leg portion spaced radially from said first leg portion and engaging said rotary shaft means, with each of said first and second leg means of said first seal means extending away from said sleeve means;

second seal means engaging another end of said sleeve means and supporting a second elastomeric sealing element, said second elastomeric sealing element having a U-shaped cross section and including a first leg portion engaging said wall means and a second leg portion spaced radially from said first leg portion and engaging said rotary shaft means, with each of said first and second leg means of said second seal means extending away from said sleeve means; and third seal means engaging one end of said second seal means with said second seal means interposed axially between said sleeve means and said third seal means, and supporting a third elastomeric sealing element, said third elastomeric sealing element having a U-shaped cross section and including a first leg portion engaging said wall means and a second leg portion spaced radially from said first leg portion and engaging said rotary shaft means, with each of said first and second leg means of said third seal means extending toward said sleeve means.

References Cited

UNITED STATES PATENTS

| | | | |
|---|---|---|---|
| 1,299,277 | 4/1919 | Wilson | 308—187 |
| 1,593,307 | 7/1926 | Lopes | 308—187 |
| 1,670,368 | 5/1928 | MacPherson | 277—68 |
| 1,707,613 | 4/1929 | Hollander. | |
| 2,287,357 | 6/1942 | Nyborg | 308—187 |
| 2,854,296 | 9/1958 | Eberle et al. | 308—187 |
| 3,166,362 | 1/1965 | Slaght | 308—187 |
| 3,408,123 | 10/1968 | Zwicky | 308—187 |

HENRY F. RADUAZO, Primary Examiner

U.S. Cl. X.R.

277—59; 308—187